United States Patent
Michalski (10) Patent No.: US 10,703,400 B2
(45) Date of Patent: Jul. 7, 2020

(54) MOTORIZED VENDING CART

(71) Applicant: MAGEC, LLC, Orlando, FL (US)

(72) Inventor: David E. Michalski, Orlando, FL (US)

(73) Assignee: MAGEC, LLC, Orlando, FL (US)

( * ) Notice: Subject to any disclaimer, the term of this patent is extended or adjusted under 35 U.S.C. 154(b) by 22 days.

(21) Appl. No.: 15/686,619

(22) Filed: Aug. 25, 2017

(65) Prior Publication Data

US 2018/0056843 A1 Mar. 1, 2018

Related U.S. Application Data (60) Provisional application No. 62/379,317, filed on Aug. 25, 2016.

(51) Int. Cl.
| | | |
|---|---|---|
| *B62B 5/00* | (2006.01) | |
| *B60P 3/025* | (2006.01) | |
| *G07F 9/10* | (2006.01) | |
| *B62B 3/00* | (2006.01) | |
| *B62B 3/02* | (2006.01) | |
| *B60P 3/20* | (2006.01) | |
| *G07F 5/26* | (2006.01) | |

(52) U.S. Cl.
CPC .......... *B62B 5/0036* (2013.01); *B60P 3/0257* (2013.01); *B62B 3/005* (2013.01); *B62B 3/02* (2013.01); *B62B 5/0053* (2013.01); *B62B 5/0069* (2013.01); *G07F 9/105* (2013.01); *B60P 3/20* (2013.01); *B62B 2204/04* (2013.01); *B62B 2204/06* (2013.01); *G07F 5/26* (2013.01)

(58) Field of Classification Search
CPC .............................. B60P 3/0257; B62B 5/004
See application file for complete search history.

(56) References Cited

U.S. PATENT DOCUMENTS

| | | |
|---|---|---|
| 2,518,764 A | 8/1950 | Dunlap |
| 2,845,780 A | 8/1958 | Conklin et al. |
| 3,874,531 A | 4/1975 | Mayo |
| 5,129,611 A | 7/1992 | Grover et al. |
| 5,626,353 A | 5/1997 | Campbell |
| 6,634,668 B2 | 10/2003 | Urffer, III et al. |
| 6,648,349 B1 | 11/2003 | Waller et al. |
| 6,814,383 B2 * | 11/2004 | Reed, III .............. B60P 3/0257 224/404 |

(Continued)

FOREIGN PATENT DOCUMENTS

| | | | |
|---|---|---|---|
| EP | 2759990 A1 | 7/2014 | |
| WO | WO-0174284 A1 * | 10/2001 | ............. B62B 5/002 |

*Primary Examiner* — Kevin Hurley
(74) *Attorney, Agent, or Firm* — The Webb Law Firm (57) ABSTRACT

A motorized vending cart includes a drive base, one or more drive motors mounted to the drive base and configured to rotate a plurality of wheels, a thermally insulated container mounted to the drive base, a power inverter mounted to the drive base, and a battery bank mounted to the drive base. The battery bank includes one or more batteries and is in electrical connection with the one or more drive motors and the power inverter. A vending cart body is mounted to the drive base and at least partially surrounds the thermally insulated container and the one or more drive motors. A control panel is electrically connected to and configured to control the one or more drive motors. An appliance is mounted to the vending section of the vending cart body and electrically connected to the power inverter.

9 Claims, 8 Drawing Sheets

(56) References Cited

U.S. PATENT DOCUMENTS

| | | | |
|---|---|---|---|
| 7,210,545 B1 | 5/2007 | Waid | |
| 8,069,939 B1 | 12/2011 | Metzler | |
| 8,162,330 B2 | 4/2012 | Melkumyan et al. | |
| 8,469,133 B2 * | 6/2013 | Kaiser | B60K 1/02 180/248 |
| 8,672,200 B2 * | 3/2014 | O'Hare | B60R 9/06 224/519 |
| 8,965,609 B2 * | 2/2015 | Takagi | G05D 17/02 701/22 |
| 9,469,234 B2 * | 10/2016 | White | B60P 3/0257 |
| 9,666,889 B2 * | 5/2017 | Loignon | B60L 1/006 |
| 10,358,043 B2 * | 7/2019 | Dao | |
| 2004/0027001 A1 * | 2/2004 | Reed, III | B60P 3/0257 307/10.1 |
| 2015/0166089 A1 | 6/2015 | Rupp | |
| 2018/0118174 A1 * | 5/2018 | Moskowitz | B60L 53/51 |

* cited by examiner

MOTORIZED VENDING CART

CROSS-REFERENCE TO RELATED APPLICATIONS

This application claims the benefit of U.S. Provisional Patent Application No. 62/379,317, filed Aug. 25, 2016 and entitled "Motorized Vending Cart", which is hereby incorporated by reference in its entirety.

BACKGROUND OF THE INVENTION

Field of the Invention

The present invention is directed toward utility and service carts, specifically to a motorized vending cart.

Description of Related Art

Carts are often used by vendors on city streets as a means of storing and transporting a variety of food and beverage items. Such carts are often used at locations remote from buildings and/or sources of electricity where storage, refrigeration, and dispensing equipment are not readily available. These carts can be commonly used to keep various food and beverage items hot or cold as needed in a mobile environment without an electric source.

However, existing carts have several disadvantages. First, existing carts must either be light enough such that they may be manually pushed by an operator, or utilize bulky, expensive, and heat-generating engines. In either case, travel range and mobility is often limited. Further, carts requiring heat, refrigeration, or electricity often rely on a generator to supply necessary power for the various components of the cart. Carts using fuel-burning engines or generators may be unsafe for indoor use. Existing carts also tend to be suitable only for vending of one specific product, and therefore may only be useful at certain venues, during certain seasons of the year, or even during certain times of day. Still further, existing carts may be suitable for use only on hard surfaces such as pavement.

An example of an existing vending cart having many of the above-described limitations is U.S. Patent Application Publication No. 2015/0166089 to Rupp ("Rupp"). Rupp is directed to a mobile cart for dispensing shaved ice or snow cones and includes a liquid topping dispensing system and ice conditioning machine thereon. The ice conditioning machine may be portably powered by batteries stored within a lower storage area. However, the cart of Rupp is unsuitable for navigation over soft surfaces such as sand. Further, the cart of Rupp is configured specifically for use as a snow cone machine and is not readily adaptable for vending of other products.

U.S. Pat. No. 7,210,545 to Waid ("Waid") is directed to a motorized cart, specifically for travel upon soft, sandy surfaces. A rearward-mounted control handle and electric motor control assembly enable an operator to drive and steer the motorized cart. A cooler and various other storage compartments may be located within the motorized cart. However, Waid only considers the transport of products and makes no provisions for actually producing or vending beverages or food from the cart.

U.S. Pat. No. 3,874,531 to Mayo ("Mayo") is directed to a mobile push cart having a plurality of compartments therein, wherein the work stations of the push cart, such as a grill, may be collapsible for transport. Like Waid, Mayo does not consider the use of battery-powered appliances. Further, the cart of Mayo must be pushed manually, leading to operator fatigue and imposing weight limitations on the cart.

In light of these and other deficiencies in the existing art, it is an object of the present invention to provide a motorized vending cart useable on several terrains including sand. It is a further object of the present invention to provide a motorized vending cart which can be used as a platform for vending several products.

SUMMARY OF THE INVENTION

The present invention is directed to a motorized vending cart. In a non-limiting embodiment, the motorized vending cart includes a drive base, one or more drive motors mounted to the drive base and configured to rotate a plurality of wheels, a thermally insulated container mounted to the drive base, a power inverter mounted to the drive base, and a battery bank mounted to the drive base. The battery bank includes one or more batteries, and the battery bank is in electrical connection with the one or more drive motors and the power inverter. A vending cart body is mounted to the drive base and at least partially surrounds the thermally insulated container and the one or more drive motors. The vending cart body defines a cooler opening permitting access to the thermally insulated container and a vending section. A control panel is electrically connected to and configured to control the one or more drive motors. An appliance is mounted to the vending section of the vending cart body and electrically connected to the power inverter.

In a non-limiting embodiment, the appliance is at least one of a snow cone machine, a blender, a popcorn maker, a toaster, a frozen beverage dispenser, and a coffee maker.

In another non-limiting embodiment, the motorized vending cart further includes a sink mounted in the vending section of the vending cart body.

In another non-limiting embodiment, the one or more batteries in the battery bank are subdivided such that a first group of the one or more batteries is connected to the drive motors and a second group of the one of more batteries is connected to the power inverter.

In another non-limiting embodiment, the motorized vending cart further includes a point-of-sale computer mounted to the vending cart body and a drawer disposed in a side of the vending cart body. The point-of sale computer is configured to lock, unlock, and open the drawer.

In another non-limiting embodiment, the motorized vending cart further includes a foot or knee pedal switch projecting from the vending cart body and wired between the appliance and the power inverter such that the foot or knee pedal switch regulates power to the appliance from the power inverter.

The present invention is also directed to a motorized vending cart which includes a drive base, one or more drive motors mounted to the drive base and configured to rotate a plurality of wheels, and a battery bank mounted to the drive base. The battery bank includes one or more batteries, and the battery bank is in electrical connection with the one or more drive motors. A vending cart body is mounted to the drive base and at least partially surrounds the one or more drive motors. The vending cart body defines a vending section. A control panel is electrically connected to and configured to control the one or more drive motors. The vending section defines one or more vending stations each configured for mounting of an appliance or component.

In a non-limiting embodiment, each of the vending stations is configured for removable mounting of the appliance or component, such that the appliance or component is replaceable with a different appliance or component.

In another non-limiting embodiment, the motorized vending cart further includes a thermally insulated container mounted to the drive base and accessible through an opening in the vending cart body.

In another non-limiting embodiment, the motorized vending cart further includes a beer tap mounted to one of the vending stations. The beer tap is plumbed to the thermally insulated container.

In another non-limiting embodiment, the motorized vending cart further includes a power inverter mounted inside the vending cart body and wired to a power receptacle disposed in the vending cart body.

In another non-limiting embodiment, the one or more batteries in the battery bank are subdivided such that a first group of the one or more batteries is connected to the drive motors and a second group of the one of more batteries is connected to the power inverter.

In another non-limiting embodiment, the motorized vending cart further includes a snow cone machine mounted to a first of the vending stations and a snow cone holder mounted to a second of the vending stations.

In another non-limiting embodiment, the motorized vending cart further includes a point-of-sale computer mounted to one of the vending stations and a drawer mounted to one of the vending cart body or one of the vending stations. The point-of-sale computer is configured to lock, unlock, and open the drawer.

In another non-limiting embodiment, the motorized vending cart further includes a first appliance mounted to a first of the vending stations, wherein the first appliance is one of a snow cone machine, a blender, a popcorn maker, a toaster, a frozen beverage dispenser, a coffee maker, and a point-of-sale computer.

In another non-limiting embodiment, the motorized vending cart further includes a second appliance mounted to a second of the vending stations, wherein the second appliance is one of a snow cone machine, a blender, a popcorn maker, a toaster, a frozen beverage dispenser, a coffee maker, and a point-of-sale computer.

In another non-limiting embodiment, the motorized vending cart further includes a sink mounted in the vending section of the vending cart body.

In another non-limiting embodiment, the motorized vending cart further includes a foot or knee pedal switch projecting from the vending cart body and wired between the power receptacle and the power inverter such that the foot or knee pedal switch regulates power to the power receptacle from the power inverter.

The present invention is also directed to a motorized vending cart which includes a drive base, one or more drive motors mounted to the drive base and configured to rotate a plurality of wheels, and a battery bank mounted to the drive base. The battery bank includes one or more batteries, and the battery bank is in electrical connection with the one or more drive motors. The motorized vending cart further includes a thermally insulated container mounted to the drive base, a vending cart body mounted to the drive base and at least partially surrounding the one or more drive motors and the thermally insulated container, a control panel electrically connected to and configured to control the one or more drive motors, and at least one beer tap mounted to the vending cart body and plumbed to the thermally insulated container.

In a non-limiting embodiment, the motorized vending cart further includes a cup dispenser disposed in the vending cart body.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For the purposes of the description hereinafter, the terms "upper", "lower", "right", "left", "vertical", "horizontal", "top", "bottom", "side", "front", "back", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and physical characteristics related to the embodiments disclosed herein are not to be considered as limiting. As used throughout the drawings, like reference numerals refer to like components or method steps unless otherwise indicated.

Figure 1:
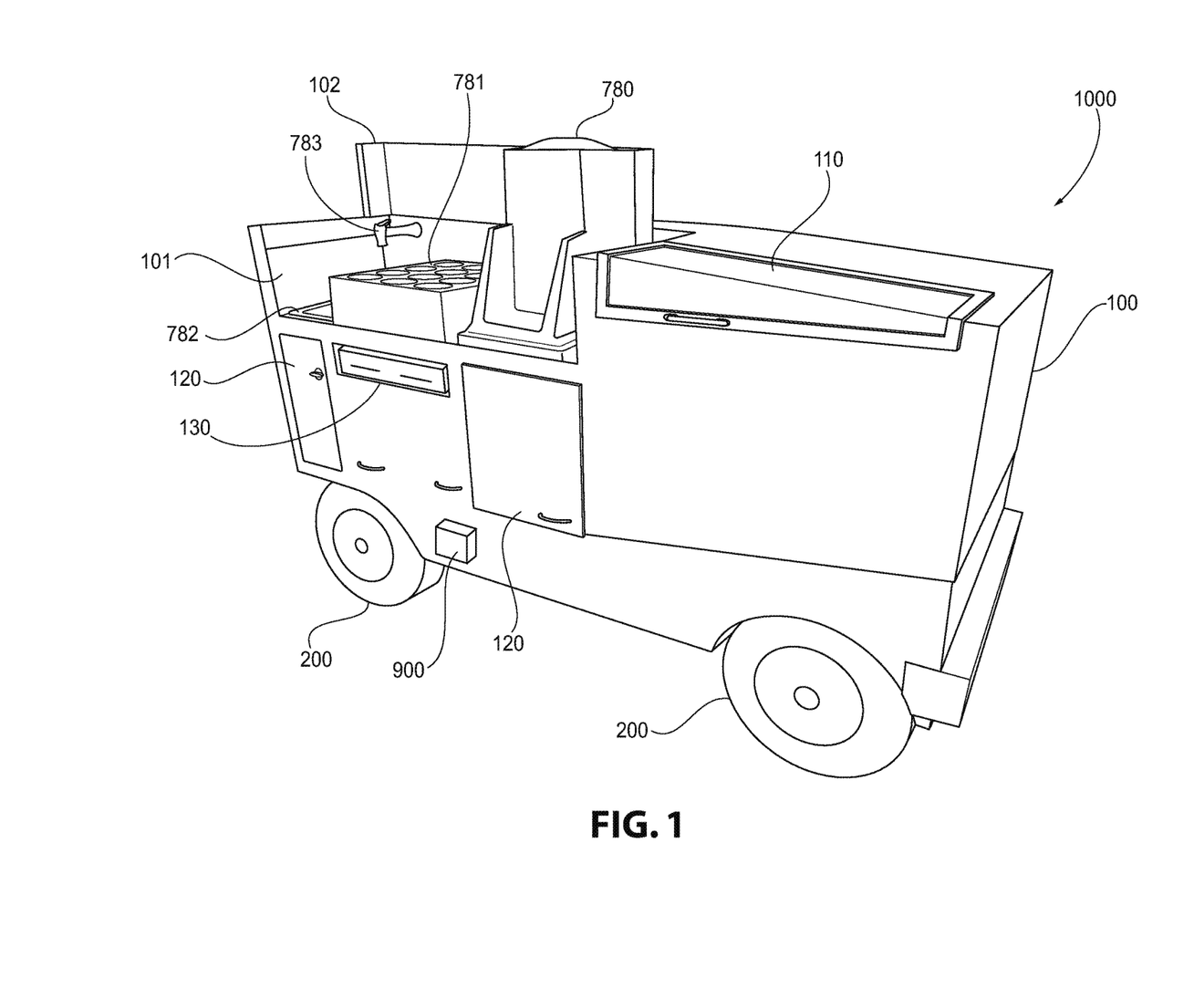
FIG. 1 is a right side perspective view of a motorized vending cart in accordance with an embodiment of the present invention.
Figure 2:
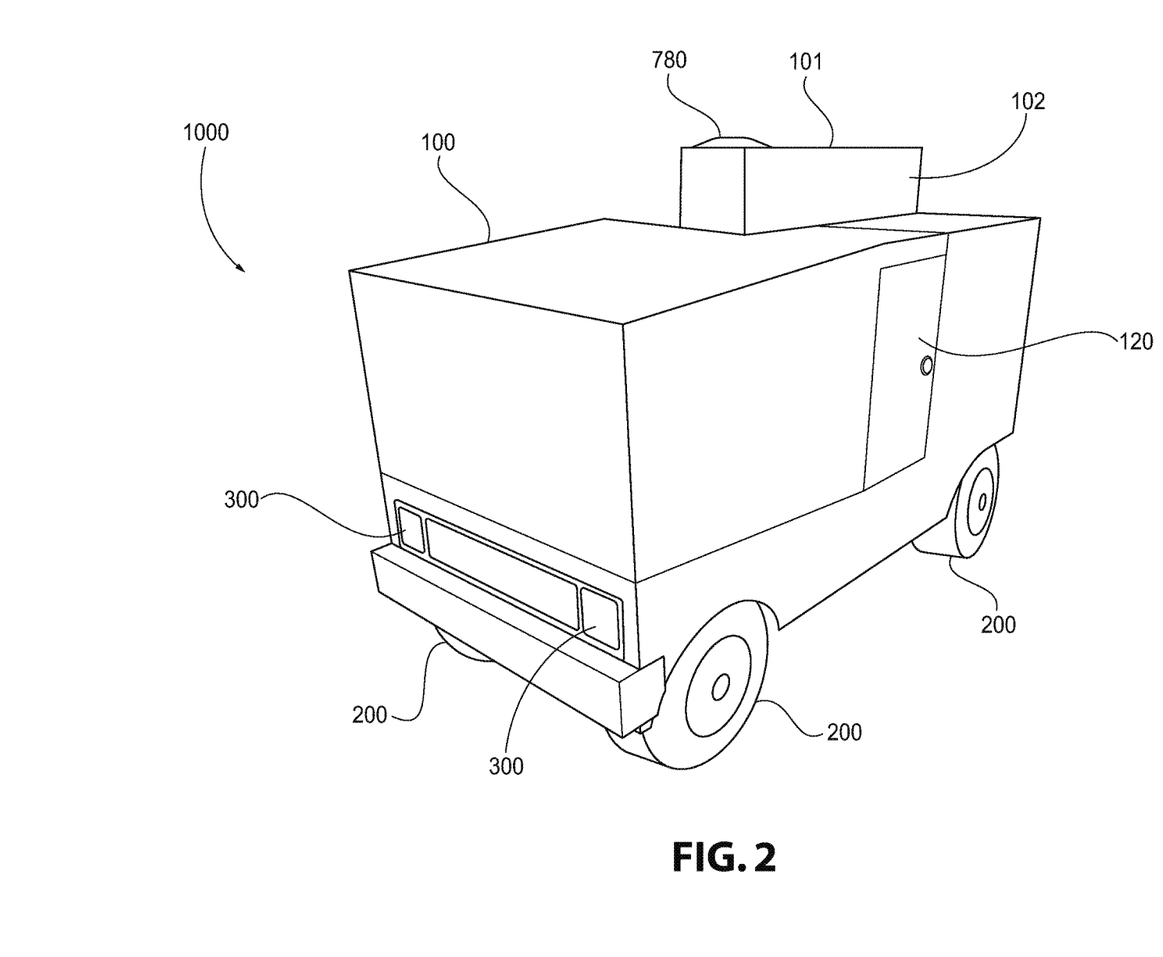
FIG. 2 is a left side perspective view of the motorized vending cart of FIG. 1.

The present invention is directed to a motorized vending cart 1000, particularly having the ability to operate on the beach. However, the use of the motorized vending cart 1000 on the beach is merely exemplary and the motorized vending cart 1000 can be utilized in other environments as well. Referring now to FIGS. 1-2, an embodiment of the motorized vending cart 1000 generally includes a vending cart body 100 which houses and protects the various internal components of the motorized vending cart 1000. These various internal components will be described later with reference to FIGS. 5-6. With continued reference to FIGS. 1-2, a front section of the vending cart body 100 may include a cooler door 110 for accessing a thermally insulated container 400 (shown in FIG. 5). Further, the vending cart body 100 may serve as a mounting point for various vending appliances.

In the embodiment shown in FIG. 1, for example, a snow cone machine 780 and a snow cone holding rack 781 are mounted to a vending section 101 recessed in the vending cart body 100. The vending section 101 may further include cutouts for mounting a sink 782, a faucet 783, or other sanitation components. A backsplash 102 may at least partially enclose the vending section 101 to shield the remainder of the vending cart body from spills and splashes made in the vending section 101. The vending cart body 100 may further include various door panels 120 and/or drawers 130 for accessing the interior of the vending cart body 100, or for storage of products, supplies, and/or money.

A foot or knee pedal switch 900 may project from the vending cart body 100 below the vending section 101. The foot or knee pedal switch 900 may be a momentary switch which, when depressed, completes an electrical circuit between devices wired to the foot or knee pedal switch 900. The foot or knee pedal switch 900 may be used to regulate or control power to one or more of the components of the motorized vending cart 1000, such as the snow cone machine 780 depicted in FIG. 1. Utilizing the foot or knee pedal switch 900, the operator is able to use both hands for performing tasks while controlling the snow cone machine 780 with his or her leg.

With continued reference to FIGS. 1-2, the motorized vending cart 1000 includes a plurality of wheels 200 for propelling the motorized vending cart 1000 over various terrain. The plurality of wheels 200 may be particularly designed or selected for travel over sand, though other environments and terrains are also to be considered within the scope and spirit of the present invention. For example, the wheels 200 may be oversized to assist in traversing soft surfaces such as beaches. However, the motorized vending cart 1000 is not limited to the use of oversized wheels 200 and may include different types of wheels 200 for different terrains that the motorized vending cart 1000 is expected to traverse. The motorized vending cart 1000 may further include lights 300 to provide visibility when operating the motorized vending cart at night or in other low-light circumstances.

Figure 3:
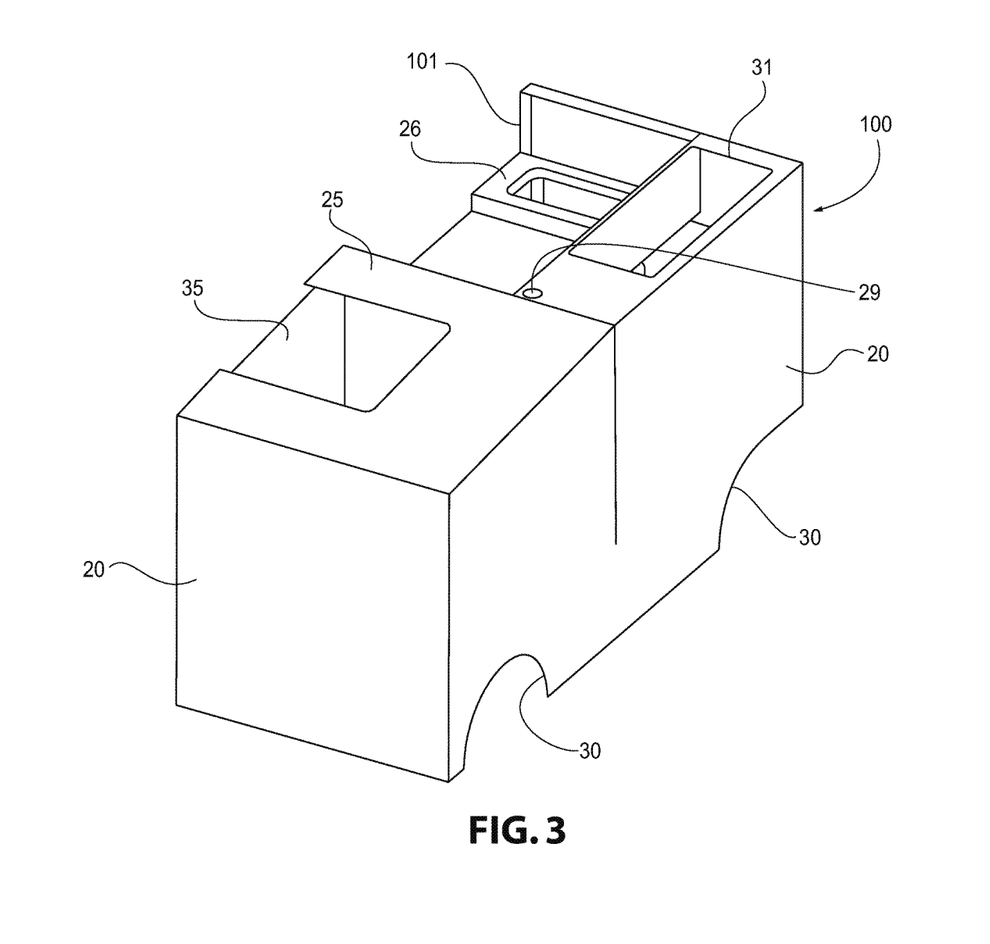
FIG. 3 is a left side perspective view of a vending cart body of the motorized vending cart of FIG. 1.
Figure 4:
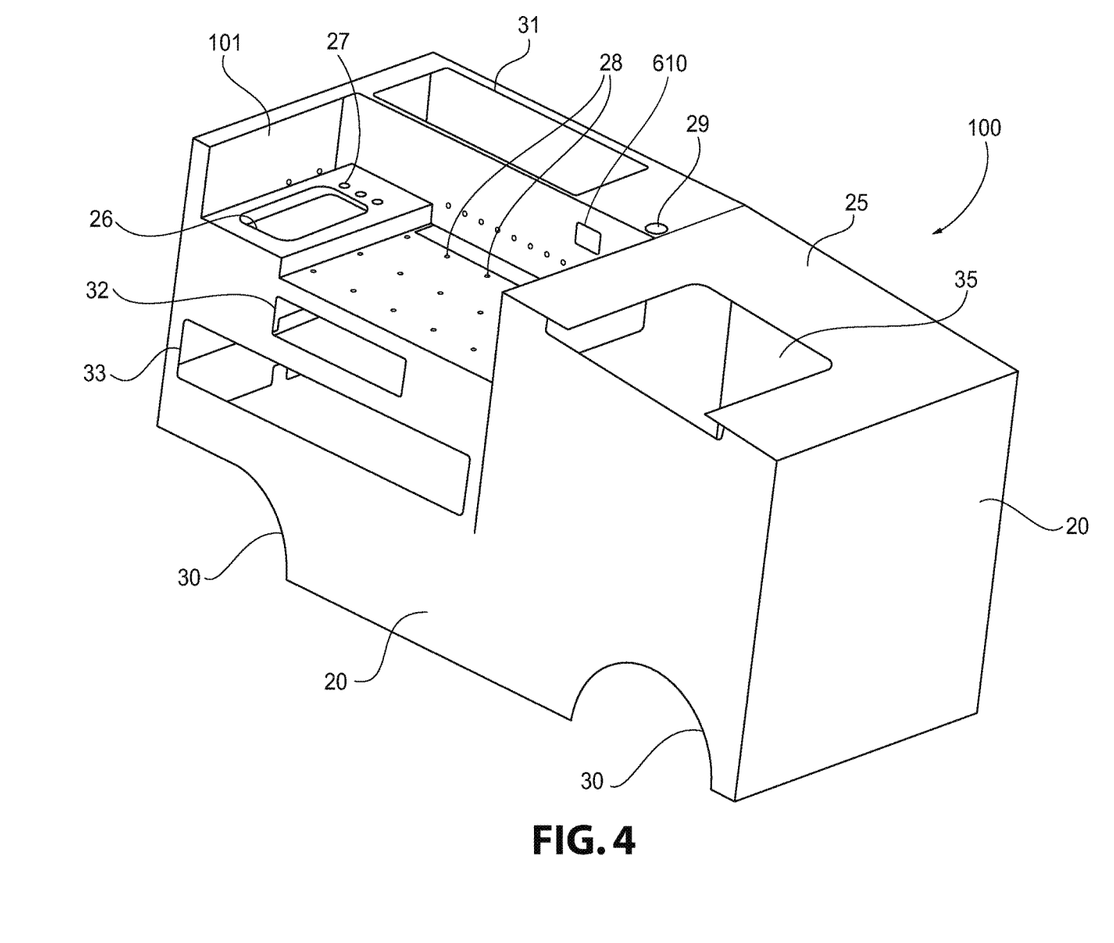
FIG. 4 is a right side perspective view of the vending cart body of FIG. 3.

Referring now to FIGS. 3-4, the vending cart body 100 generally includes a plurality of sides 20 and a top 25 defining an open-bottomed shell structure. The sides 20 and top 25 may be made of aluminum sheet or a similar rigid material. In an exemplary, non-limiting embodiment, the vending cart body 100 may be approximately 60 inches long by 30 inches wide. However, the specific dimensions of the vending cart body 100 may vary according to the intended use of the motorized vending cart 1000.

Two opposing sides 20 may include fender cutouts 30 for accommodating the plurality of wheels 200. The vending section 101 may be recessed into one or more of the sides 20 and top 25. The vending section 101 may include a sink cutout 26 for receiving the sink 782 (see FIG. 1), and one or more faucet cutouts 27 for receiving the faucet 783 (see FIG. 1) and associated plumbing. The vending section 101 may further include mounting holes 28 for securing various appliances, such as the snow cone machine 780 (see FIG. 1), to the vending cart body 100. An umbrella support hole 29 may be provided in the vending cart body 100 for receiving an umbrella pole. The umbrella support hole 29 may be centrally located in the vending cart body 100 such that an umbrella inserted therein provides shade evenly over the motorized vending cart 1000.

With continued reference to FIGS. 3-4, the vending cart body 100 may further include various storage compartments and/or openings for access to the interior of the motorized vending cart 1000. For example, a cooler opening 35 may be located towards the front of the motorized vending cart 1000 and provide access to the thermally insulated container 400 (see FIGS. 5-6). A compartment 31 may be located adjacent to the vending section 101 for storage of supplies and/or condiments. A door panel 120 may be mounted to the vending cart body 100 covering the compartment 31, such that the door panel 120 may be opened to access the compartment 31. A cash register opening 32 may be located in one of the sides 20 of the vending cart body 100. The cash register opening 32 is configured to receive a drawer 130 (see FIG. 1) for storing and dispensing cash. A service cutout 33 may be provided in a side 20 of the vending cart body 100 for providing access to the interior of the motorized vending cart 1000. Another door panel 120 may be mounted to the vending cart body 100 covering the service cutout 33, such that the door panel 120 may be opened or removed to access the interior of the motorized vending cart 1000 for service and/or maintenance.

Any or all of the cooler door 110, door panels 120, and drawers 130 may be lockable to prevent access by unauthorized persons. It should be appreciated that the compartment 31, cash register opening 32, service cutout 33, and their corresponding door panels 120 and/or drawers 130 are described with reference to one exemplary embodiment which should not be construed as limiting. Other embodiments may include additional openings, compartments 31, door panels 120, and drawers 130, or may rearrange these components, within the scope and spirit of the present invention.

Figure 5:
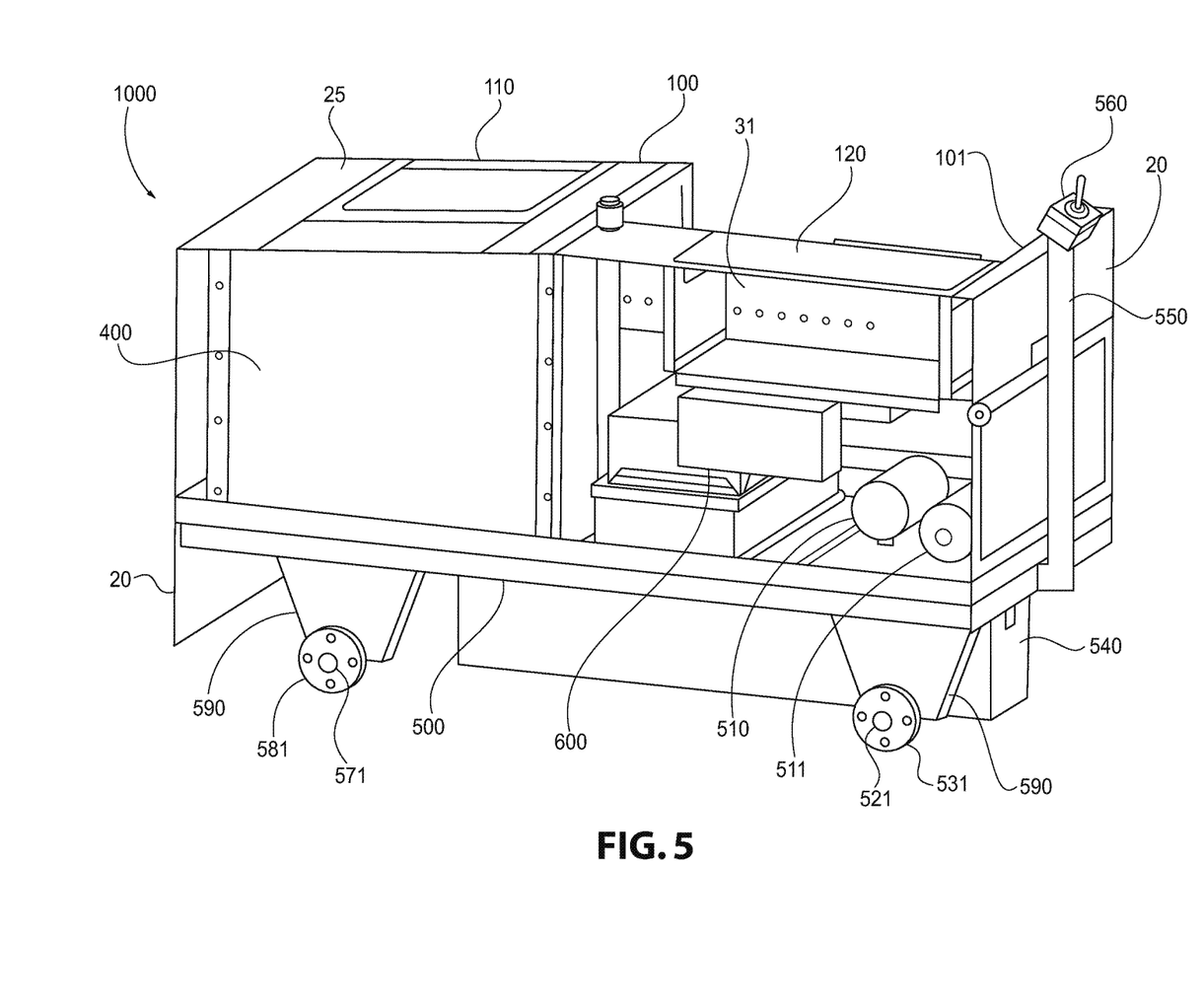
FIG. 5 is a cutaway right side view of a motorized vending cart in accordance with another embodiment of the present invention.
Figure 6:
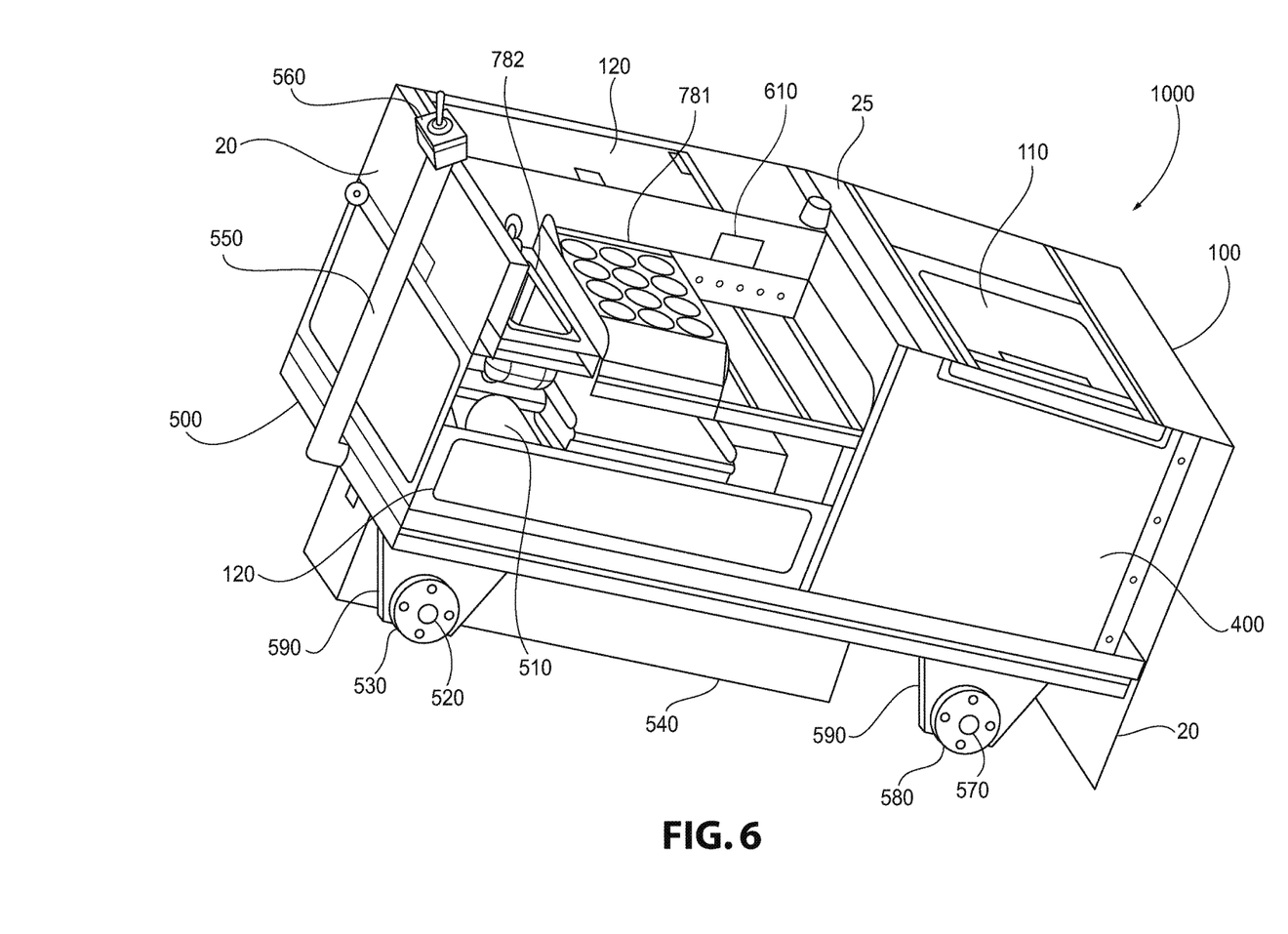
FIG. 6 is a cutaway left side view of the motorized vending cart of FIG. 5.

FIGS. 5-6 illustrate left-side and right-side cutaway views, respectively, of the motorized vending cart 1000 showing various internal components. In particular, the motorized vending cart 1000 includes a drive base 500 to which the vending cart body 100 is mounted. The drive base 500 may be of rigid construction such as an aluminum tube frame supporting an aluminum sheet platform. The thermally insulated container 400 may be mounted to the drive base 500 at a front section of the motorized vending cart 1000 such that the thermally insulated container 400 is accessible through the cooler door 110.

With continued reference to FIG. 5, one or more drive motors 510, 511 are mounted to the drive base 500 and coupled to corresponding drive axles 520, 521 on left and right sides, respectively, of the motorized vending cart 1000. The drive axles 520, 521 may be coupled to their corresponding drive motors 510, 511 via a chain-and-sprocket or belt-and-pulley arrangement. Alternatively, each of the drive motors 510, 511 may have an integral gearbox for reducing the rotational speed on the drive motors 510, 511. Each of the drive axles 520, 521 is coupled to a corresponding wheel hub 530, 531. One of the plurality of wheels 200 is mounted to each of wheel hubs 530, 531 such that rotation of each of the drive motors 510, 511 drives the corresponding wheel 200. In other non-limiting embodiments, the wheels 200 may be mounted directly to the drive axles 520, 521 via a key and/or set screw, eliminating the need for the wheel hubs 530, 531.

In the non-limiting embodiment depicted in FIGS. 5-6, only the two rear wheels 200 are driven by the drive motors 510, 511. The front wheels 200 are free-spinning and mounted to one or more non-drive axles 570, 571 via wheel hubs 580, 581. As with the rear wheel hubs 530, 531, the front wheel hubs 580, 581 may be eliminated in cases where the wheels 200 are attached directly to the non-drive axles 570, 571, such as via a key and/or set screw.

In alternative non-limiting embodiments, the front wheels 200 may also be driven by the drive motors 510, 511, or additional drive motors may be provided specifically for the front wheels 200. In such embodiments, the non-drive axles 570, 571 may be substituted for drive axles substantially similar to the drive axles 520, 521 coupled to either the drive motors 510, 511 or additionally provided drive motors.

With continued reference to FIGS. 5-6, the drive axles 520, 521 and non-drive axles 570, 571 may be mounted to the drive base 500 via axle supports 590. The axle supports 590 may be rigidly connected to the drive base 500 by any means known in the art, including welding or riveting. The drive axles 520, 521 may be mounted to the axle supports 590 via rotary bearings to permit rotation of the drive axles 520, 521 relative to the axle supports 590. The non-drive axles 570, 571 may also be mounted to the axle supports 590 via rotary bearings, or may be rigidly connected to the axle supports 590 in cases where the wheel hubs 530, 531 and/or front wheels 200 are configured to be free-spinning with respect to the non-drive axles 570, 571.

Power is supplied to the drive motors 510, 511 from a battery bank 540. The battery bank 540 may include, in an exemplary embodiment, one or more automotive style batteries supported in a battery tray. In particular, the battery bank 540 may include one or more 12-volt deep-cycle batteries to facilitate the extended power draw required by the drive motors 510, 511. The drive motors 510, 511 may be independently controllable to facilitate steering of the motorized vending cart 1000. For example, providing power to only the right-side drive motor 510 causes the motorized vending cart 1000 to steer to the left, and vice versa. The drive base 500 may include a drive column 550 extending from the drive base 500 and terminating in a control panel 560. The control panel 560 is electrically connected to the drive motors 510, 511 and battery bank 540 and facilitates operator control of the drive motors 510, 511. For example, the control panel 560 may include a power button for turning the motorized vending cart 1000 on and off, a joystick for directional control of the motorized vending cart 1000, a speed control for adjusting the speed of the motorized vending cart 1000, and a brake control for stopping the motorized vending cart 1000. The control panel 560 may further include a switch for controlling the lights 300 and various other electrical components of the motorized vending cart 1000.

Because the motorized vending cart 1000 is driven by electricity rather than manual power, operator fatigue is essentially eliminated. Further, the motorized vending cart 1000 may be constructed substantially heavier than comparable manually pushed or pulled carts, since operator strength is not a limiting factor in design. Thus, the motorized vending cart 1000 may be designed to transport heavier loads of products without concern for the additional weight.

With continued reference to FIG. 5, the motorized vending cart 1000 may further include a power inverter 600 mounted within the vending cart body 100 and electrically connected to the battery bank 540. The battery bank 540 may be subdivided such that the drive motors 510, 511 and the power inverter 600 draw power from different batteries. The power inverter 600 converts direct current (DC) produced by the battery bank 540 into alternating current (AC) for powering appliances or components mounted to the motorized vending cart 1000. The power inverter 600 may be wired to a power receptacle 610 in the vending cart body 100. One or more of the appliances or components, such as the snow cone machine 780 depicted in FIGS. 1-2, may then be plugged into the power receptacle 610. The power receptacle 610 may be wired to the power inverter 600 in series with the foot or knee pedal switch 900 so that the appliance or component plugged into the power receptacle 610 is controllable via the foot or knee pedal switch 900. As described above, the foot or knee pedal switch 900 may be a momentary switch which, when depressed, completes an electrical circuit between the power receptacle 610 and the power inverter 600. Thus, by depressing the foot or knee pedal switch 900, the snow cone machine 780 or other attached appliance may receive power from the power inverter 600.

With continued reference to FIG. 6, the drive motors 510, 511 may be accessed for service and/or maintenance via the door panel 120 corresponding to the service cutout 33. The service cutout 33 also provides access to components underneath the vending section 101, such as a water storage tank and pump for supplying water under pressure to the faucet 783.

Figure 7:
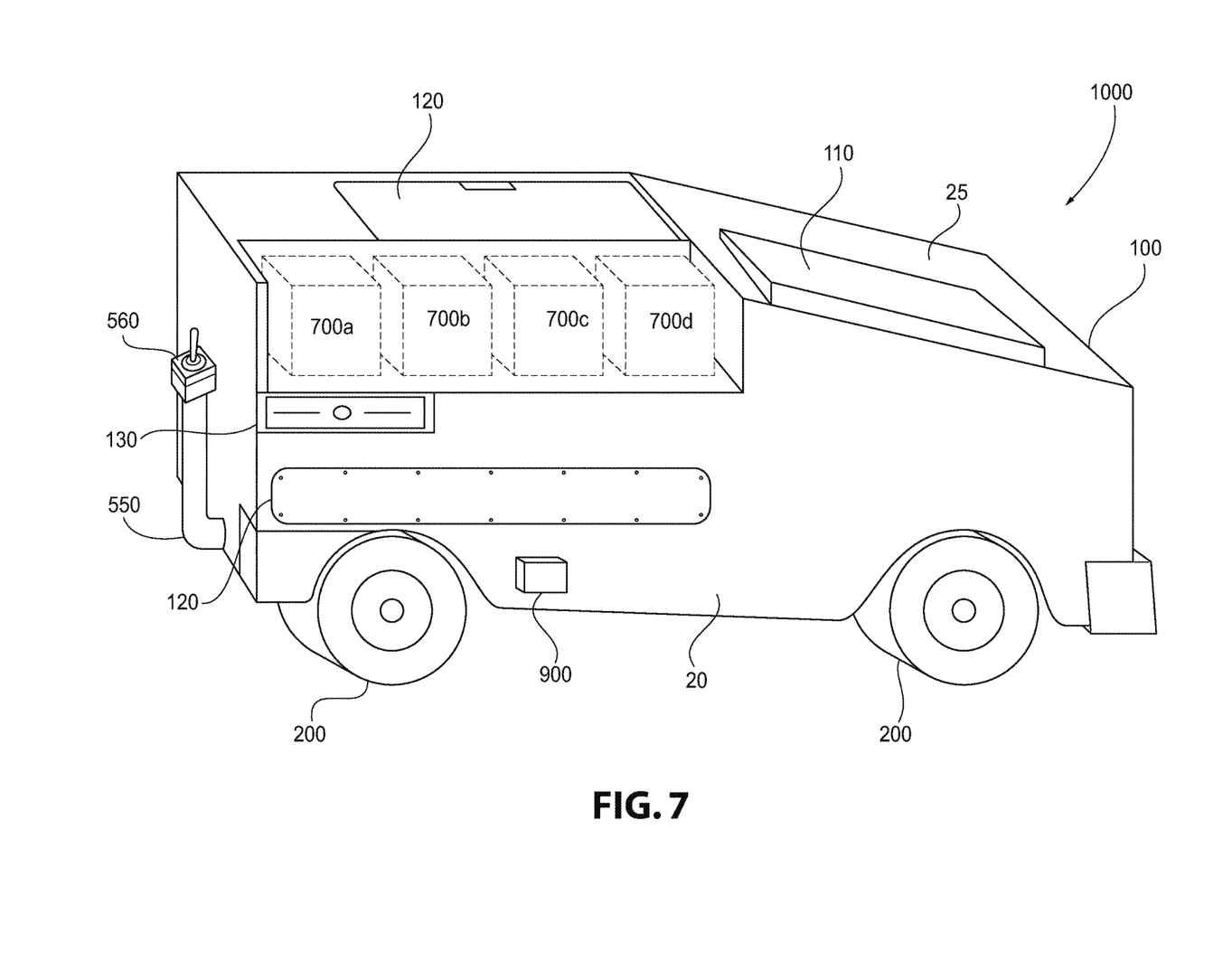
FIG. 7 is a right side view of a motorized vending cart in accordance with another embodiment of the present invention.

Referring now to FIG. 7, the motorized vending cart 1000 may be modularized such that a variety of appliances or other components may be mounted to the vending section 101 of the vending cart body 100. In particular, the vending section 101 may include one or more vending stations 700a-700n, each configured for mounting of an appliance or component. Any or all of the appliance or components attached to the vending stations 700a-700n may be controlled via the foot or knee pedal switch 900, as explained with above reference to FIGS. 5-6. Alternatively, the foot or knee pedal switch 900 may be omitted such that the power inverter 600 is directly wired to the power receptacle 610.

Figure 8:
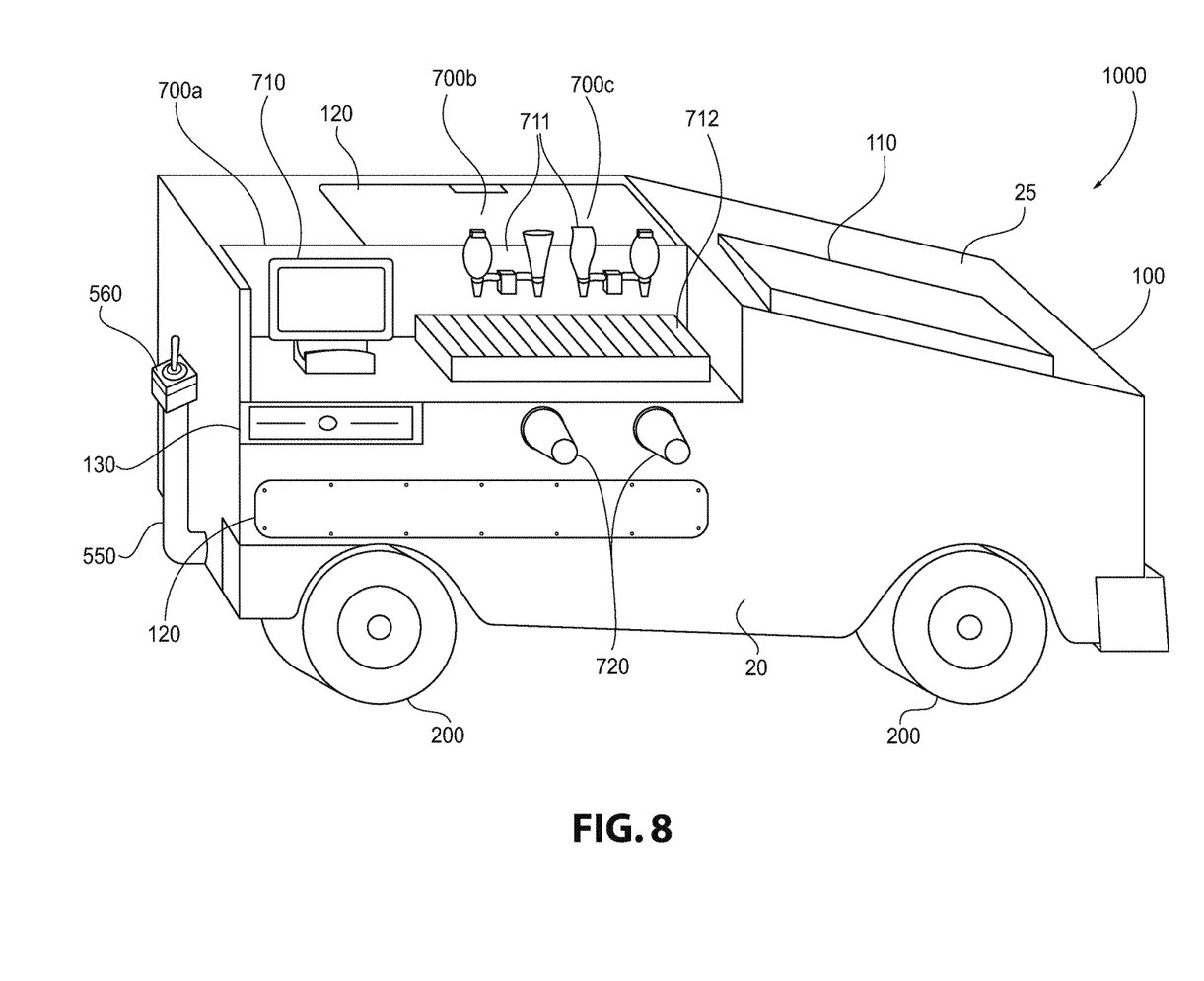
FIG. 8 is a perspective view of a motorized vending cart in accordance with another embodiment of the present invention.

FIG. 8 depicts a non-limiting exemplary embodiment having three vending stations 700a-700c. A first vending station 700a is configured for mounting of a point-of-sale (POS) computer 710 for calculating bills and recording sales. The POS computer may also be configured to lock, unlock, and open the drawer 130 via an actuator, such that money may be securely stored in the drawer 130 to prevent theft. A second vending station 700b and a third vending station 700c are each configured for mounting of a beer tap 711 and drip tray 712. The depicted embodiment is merely exemplary, and it should be appreciated that a wide array of appliances or components may be attached to each of the vending stations 700a-700n. Each vending station 700a-700n may also be configured such that the attached appliance or component is easily removable and replaceable with a different appliance or component. For example, the attached appliance or component may be mounted to the corresponding vending station 700a-700n via thumbscrews. In this manner, the appliances and components can be changed to allow for the vending of different products depending on the season, venue, time of day, or other relevant factors.

For example, one or both of beer taps 711 mounted to the second and third vending stations 700b-700c may be replaced with, for example, the snow cone machine 780 shown in FIGS. 1-2. Other appliances or components that may be mounted to the stations 700a-700n include, by way of example, a blender, a popcorn maker, a toaster, a frozen beverage dispenser, or a coffee maker. One skilled in the art may appreciate additional appliances and components suitable for use on the motorized vending cart 1000 which are to be considered within the scope and spirit of the present invention.

In embodiments wherein the vending stations 700a-700n include one or more beer taps 711, the thermally insulated container 400 may be configured to store one or more kegs plumbed to the beer taps 711. The motorized vending cart may further include one or more cup dispensers 720 disposed in any of the sides 20 or top 25 of the vending cart body 100.

In use, the motorized vending cart 1000 may be prepared for service by charging the one or more batteries in the battery bank 540 and mounting the desired appliance and component to the vending station 101. The thermally insulated container 400 may then be filled with ice as needed. The ice may be used to make snow cones using the snow cone machine 780, or to provide refrigeration to products that must be transported and consumed chilled or frozen. For example, the thermally insulated container 400 may be used to chill a beer keg in embodiments of the motorized vending cart 1000 that utilize one or more beer taps 711. In other embodiments, the thermally insulated container 400 may be used to chill drinks and/or condiments. In embodiments where cooling is not required, the thermally insulated container 400 may be used for basic storage of products and supplies. Other products such as condiments, dishes, cups, and napkins may be loaded in the compartment 31 and/or cup dispenser 720.

The motorized vending cart 1000 may then be driven to a desired venue, such as a beach, using the control panel 560 to navigate the motorized vending cart 1000. The power inverter 600 may then be turned on to supply electricity to any attached appliances or components, such as the snow cone machine 780. The operator may then commence making and selling products for customers. In sunny or rainy conditions, an umbrella may be inserted into the umbrella support hole 29 to protect the user and customer from the elements.

If the cooler door 110, door panels 120, and drawers 130 are lockable, the operator may step away from the motorized vending cart 1000 without the risk of products or money being stolen.

It is to be understood that use of the motorized vending cart 1000 as described above is merely exemplary and may be modified as desired or necessitated.

While various embodiments of motorized vending carts are shown in the accompanying drawings and described hereinabove in detail, other examples will be apparent to, and readily made by, those skilled in the art without departing from the scope and spirit of the invention. For example, it is to be understood that this invention contemplates that, to the extent possible, one or more features of any embodiment may be combined with one or more features of any other embodiment. Accordingly, the foregoing description is intended to be illustrative rather than restrictive.

The invention claimed is:

1. A motorized vending cart, comprising:
a drive base;
one or more drive motors mounted to the drive base and configured to rotate a plurality of wheels;
a thermally insulated container mounted to the drive base;
a power inverter mounted to the drive base;
a battery bank mounted to the drive base and including one or more batteries, the battery bank in electrical connection with the one or more drive motors and the power inverter;
a vending cart body mounted to the drive base and at least partially surrounding the thermally insulated container and the one or more drive motors, the vending cart body defining:
a cooler opening permitting access to the thermally insulated container; and
a vending section;
a control panel electrically connected to and configured to control the one or more drive motors; and
an appliance mounted to the vending section of the vending cart body and electrically connected to the power inverter.

2. The motorized vending cart of claim 1, wherein the appliance is at least one of a snow cone machine, a blender, a popcorn maker, a toaster, a frozen beverage dispenser, and a coffee maker.

3. The motorized vending cart of claim 1, further comprising a sink mounted in the vending section of the vending cart body.

4. The motorized vending cart of claim 1, wherein the one or more batteries in the battery bank are subdivided such that a first group of the one or more batteries is connected to the drive motors and a second group of the one of more batteries is connected to the power inverter.

5. The motorized vending cart of claim 1, further comprising:
a point-of-sale computer mounted to the vending cart body; and
a drawer disposed in a side of the vending cart body;
wherein the point-of-sale computer is configured to lock, unlock, and open the drawer.

6. The motorized vending cart of claim 1, further comprising a foot or knee pedal switch projecting from the vending cart body and wired between the appliance and the power inverter such that the foot or knee pedal switch regulates power to the appliance from the power inverter.

7. A motorized vending cart, comprising:
a drive base;
one or more drive motors mounted to the drive base and configured to rotate a plurality of wheels;
a battery bank mounted to the drive base and including one or more batteries, the battery bank in electrical connection with the one or more drive motors;
a vending cart body mounted to the drive base and at least partially surrounding the one or more drive motors, the vending cart body defining a vending section; and
a control panel electrically connected to and configured to control the one or more drive motors;
wherein the vending section defines one or more vending stations each configured for mounting of an appliance or component,
wherein the one or more batteries in the battery bank are subdivided such that a first group of the one or more batteries is connected to the drive motors and a second group of the one of more batteries is connected to a power inverter, and
wherein the power inverter is mounted inside the vending cart body and wired to a power receptacle disposed in the vending cart body.

8. The motorized vending cart of claim 7, further comprising a thermally insulated container mounted to the drive base, the thermally insulated container accessible through an opening in the vending cart body.

9. The motorized vending cart of claim 7, further comprising a sink mounted in the vending section of the vending cart body.

* * * * *